United States Patent
Barone et al.

(10) Patent No.: US 11,214,260 B2
(45) Date of Patent: Jan. 4, 2022

(54) METHOD TO CONTROL THE EXECUTION OF A SHIFT TO A LOWER GEAR WITH A RELEASED ACCELERATOR PEDAL IN A DRIVETRAIN PROVIDED WITH A DUAL-CLUTCH, SERVO-ASSISTED TRANSMISSION

(71) Applicant: FERRARI S.p.A., Modena (IT)

(72) Inventors: Alessandro Barone, Bologna (IT);
Andrea Nannini, Modena (IT);
Giacomo Senserini, Modena (IT);
Stefano Marconi, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/026,691

(22) Filed: Sep. 21, 2020

(65) Prior Publication Data

US 2021/0094549 A1   Apr. 1, 2021

(30) Foreign Application Priority Data

Sep. 30, 2019 (IT) .......................... 102019000017528

(51) Int. Cl.
*B60W 30/19*   (2012.01)
*B60W 10/02*   (2006.01)
(Continued)

(52) U.S. Cl.
CPC ............ *B60W 30/19* (2013.01); *B60W 10/02* (2013.01); *B60W 10/06* (2013.01);
(Continued)

(58) Field of Classification Search
CPC ...... B60W 30/19; B60W 10/02; B60W 10/06; B60W 10/113; B60W 2540/10;
(Continued)

(56) References Cited

U.S. PATENT DOCUMENTS

| | | | | |
|---|---|---|---|---|
| 5,407,401 A | * | 4/1995 | Bullmer | B60W 10/04 477/109 |
| 10,167,952 B2 | * | 1/2019 | Cho | F16D 48/062 |

(Continued)

FOREIGN PATENT DOCUMENTS

EP   3139070 A1   3/2017

OTHER PUBLICATIONS

Search Report issued in Italian Patent Application No. 201900017528, completed Apr. 6, 2020; 8 pages.

*Primary Examiner* — Tisha D Lewis
(74) *Attorney, Agent, or Firm* — Cantor Colburn LLP (57) ABSTRACT

A method to control the execution of a shift to a lower gear with a released accelerator pedal in a drivetrain provided with a dual-clutch, servo-assisted transmission; the following steps are provided: opening, in a first instant, an outgoing clutch; closing, in the first instant, an incoming clutch; completing the opening of the outgoing clutch with a first linear ramp in a second instant; synchronizing, between the second instant and a third instant, a rotation speed of the internal combustion engine with a rotation speed of the incoming clutch; closing of the incoming clutch with a second linear ramp starting from a fourth instant, which is prior to or coincides with the second instant; completing the closing of the incoming clutch in a fifth instant, which coincides with or is subsequent to the second instant; and activating the internal combustion engine so as to generate a torque between the fourth instant and the third instant.

11 Claims, 6 Drawing Sheets

(51) Int. Cl.
    *B60W 10/06* (2006.01)
    *B60W 10/113* (2012.01)
    *F16H 61/688* (2006.01)
    *F16H 61/28* (2006.01)

(52) U.S. Cl.
    CPC ....... *B60W 10/113* (2013.01); *F16H 61/2807* (2013.01); *F16H 61/688* (2013.01); *B60W 2540/10* (2013.01); *B60W 2540/30* (2013.01); *B60W 2710/021* (2013.01); *B60W 2710/0605* (2013.01); *B60W 2710/0644* (2013.01); *B60W 2710/0666* (2013.01); *B60W 2710/1005* (2013.01); *F16H 2306/48* (2013.01); *F16H 2708/22* (2013.01)

(58) Field of Classification Search
    CPC ....... B60W 2540/30; B60W 2710/021; B60W 2710/0605; B60W 2710/0644; B60W 2710/0666; B60W 2710/1005; F16H 61/2807; F16H 61/688; F16H 2306/48; F16H 2708/22
    See application file for complete search history.

(56) References Cited

U.S. PATENT DOCUMENTS

| | | |
|---|---|---|
| 2003/0069103 A1 | 4/2003 | Ibamoto et al. |
| 2011/0184612 A1 | 7/2011 | Fujii et al. |
| 2015/0127242 A1 | 5/2015 | Iizuka |

\* cited by examiner

METHOD TO CONTROL THE EXECUTION OF A SHIFT TO A LOWER GEAR WITH A RELEASED ACCELERATOR PEDAL IN A DRIVETRAIN PROVIDED WITH A DUAL-CLUTCH, SERVO-ASSISTED TRANSMISSION

CROSS-REFERENCE TO RELATED APPLICATIONS

This Patent Application claims priority from Italian Patent Application No. 102019000017528 filed on Sep. 30, 2019, the entire disclosure of which is incorporated herein by reference.

TECHNICAL FIELD

The invention relates to a method to control the execution of a shift to a lower gear with a released accelerator pedal in a drivetrain provided with a dual-clutch, servo-assisted transmission (namely, a gear shift in which the following or incoming gear is lower than the previous or outgoing gear).

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

Currently, a shift to a lower gear with a released accelerator pedal entails opening the outgoing clutch (namely, the clutch associated with the previous gear), increasing the rotation speed of the internal combustion engine by turning on the internal combustion engine (namely, by having the internal combustion engine generate a positive torque determining an acceleration of the drive shaft) and, finally, closing the incoming clutch (namely, the clutch associated with the following gear). In this way, the synchronization (increase) of the rotation speed of the internal combustion engine with the speed imposed by the following gear (namely, by the incoming clutch) takes place when both clutches are open, thus causing the internal combustion engine to generate a positive torque (whereas, for the remaining time, the internal combustion engine is in cut-off condition and operates as engine brake, generating a resisting, namely braking torque).

This mode of execution a shift to a lower gear with a released accelerator pedal is "fun" (namely, appreciated by drivers, since it provides a feeling of sports-driving also thanks to the sound produced by the internal combustion engine during the synchronization of its own rotation speed), but, on the other hand, it is not very comfortable, since, because of the interruption in the transmission of the torque to the drive wheels, it determines an uncomfortable longitudinal acceleration profile of the road vehicle: indeed, the longitudinal acceleration of the road vehicle suddenly shifts from an initial deceleration to a zero acceleration in order to then quickly go back to a final deceleration, which is greater than the previous one (the feeling resulting from this is a quick backward pull and a subsequent forward pull, which, as a whole, are not very comfortable).

Furthermore, this gear shift execution mode generates a certain metal noise (which can generally be perceived by drivers, especially at a low rpm), since the simultaneous opening of the two clutches determines an unloading of the drivetrain with a subsequent restoring of backlashes when the incoming clutch is closed.

Patent application EP3139070A1 describes a method to control the execution of a shift to a lower gear while an accelerator pedal is released in a drivetrain provided with a dual-clutch, servo-assisted transmission. The method comprises the following steps: in a first instant, opening an outgoing clutch associated with the current gear and closing an incoming clutch associated with the following gear; in a second instant, completing the opening of the outgoing clutch and completing the closing of the incoming clutch; synchronizing, between the second instant and a third instant, a rotation speed of the internal combustion engine with a rotation speed of the incoming clutch, namely with the rotation speed imposed by the gear ratio of the following gear; and controlling the incoming clutch between the second instant and the third instant so as to have the incoming clutch temporarily transmit a greater torque than the braking torque of the internal combustion engine in order to accelerate the internal combustion engine using the kinetic energy owned by the road vehicle.

DESCRIPTION OF THE INVENTION

The object of the invention is to provide a method to control the execution of a shift to a lower gear with a released accelerator pedal in a drivetrain provided with a dual-clutch, servo-assisted transmission, said method not suffering from the drawbacks discussed above and, at the same time, being easy and economic to be implemented.

According to the invention there is provided a method to control the execution of a shift to a lower gear with a released accelerator pedal in a drivetrain provided with a dual-clutch, servo-assisted transmission, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
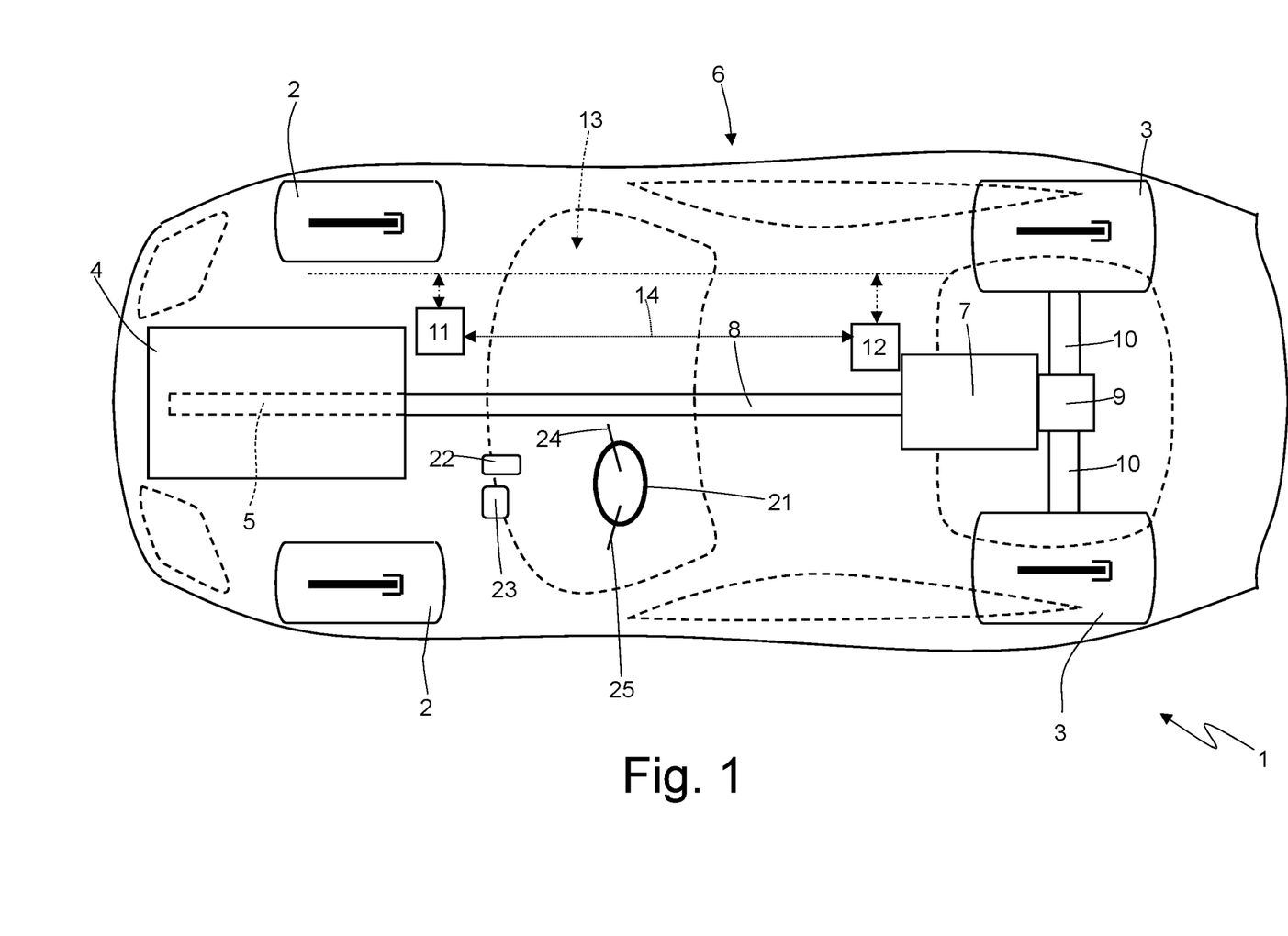
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque $T_E$, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the internal combustion engine 4, which controls the internal combustion engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the internal combustion engine 4 and the control unit 12 of the drivetrain 6 are connected to the BUS line 13 and, therefore, can communicate with one another by means of messages sent through the BUS line 13. Furthermore, the control unit 11 of the internal combustion engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the internal combustion engine 4 without the delays caused by the BUS line 13. Alternatively, the synchronization cable 14 could be absent and all communications between the two control units 11 and 12 could be exchanged using the BUS line 13.

Figure 2:
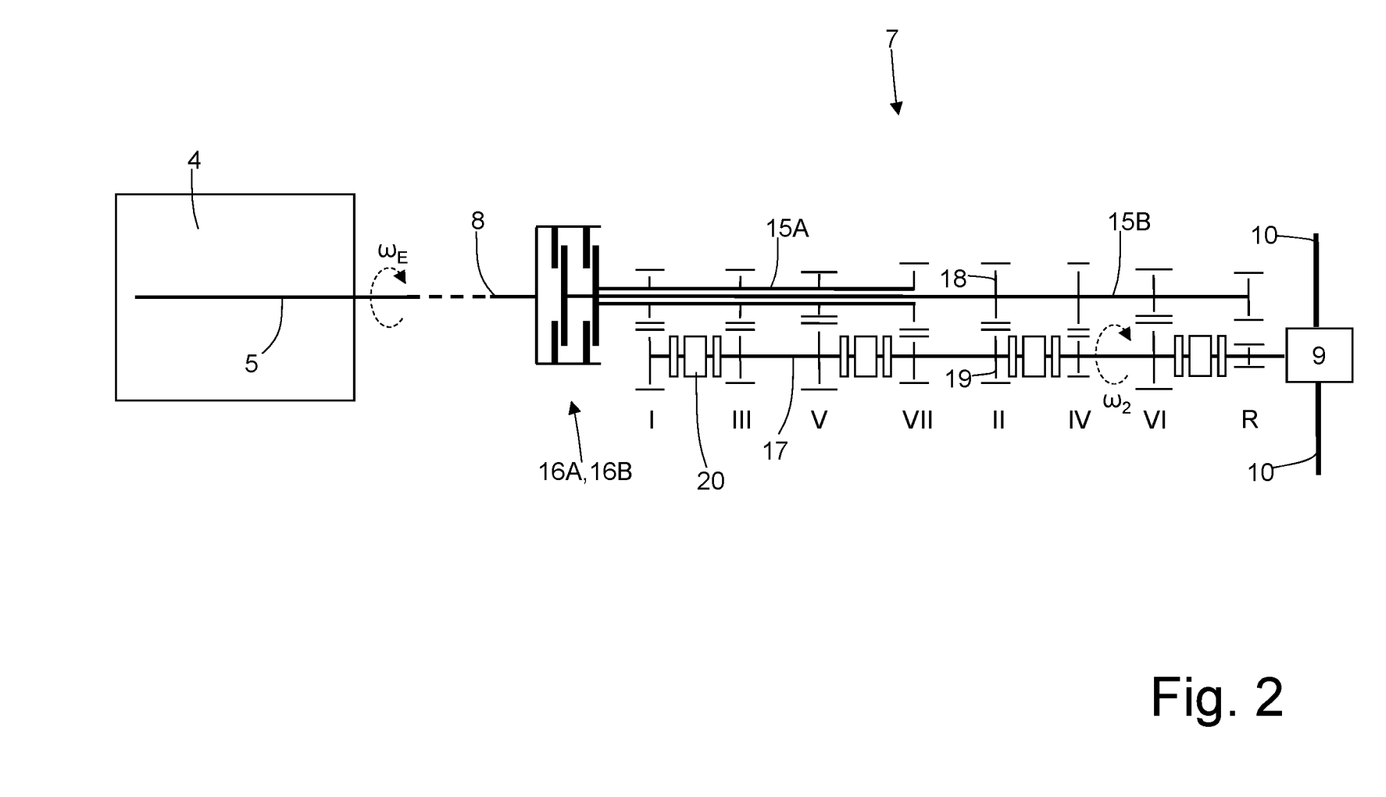
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

Hereinafter there is a description of the modes of execution of a downshift with a released accelerator pedal 22 from a current, higher gear A to a following, lower gear B (when the accelerator pedal 22 is released, the internal combustion engine 4 operates in cut-off condition and acts as engine brake); namely, the current gear A has a greater gear ratio than the following gear B (hence, given the same speed of the road vehicle 1, the current gear A causes the internal combustion engine 4 to run more slowly than the following gear B).

In an initial situation (i.e. before the gear shift), an outgoing clutch 16B is closed in order to transmit the motion to a primary shaft 15A, which, in turn, transmits the motion to the secondary shaft 17 through the current gear A, which is engaged; an incoming clutch 16B, on the other hand, is open and, hence, isolates a primary shaft 15B from the transmission shaft 8. Before beginning the upshift, the following gear B is engaged in order to connect, through the gear B, the primary shaft 15B to the secondary shaft 17. When the driver sends the gear shift command, the gear shift is carried out by opening the outgoing clutch 16A in order to disconnect the primary shaft 15A (hence, the gear A) from the transmission shaft 8 (i.e. from the drive shaft 5 of the internal combustion engine 4) and, (more or less) simultaneously, by closing the incoming clutch 16B in order to connect the primary shaft 15B (hence, the gear B) to the transmission shaft 8 (i.e. to the drive shaft 5 of the internal combustion engine 4).

Figure 3:
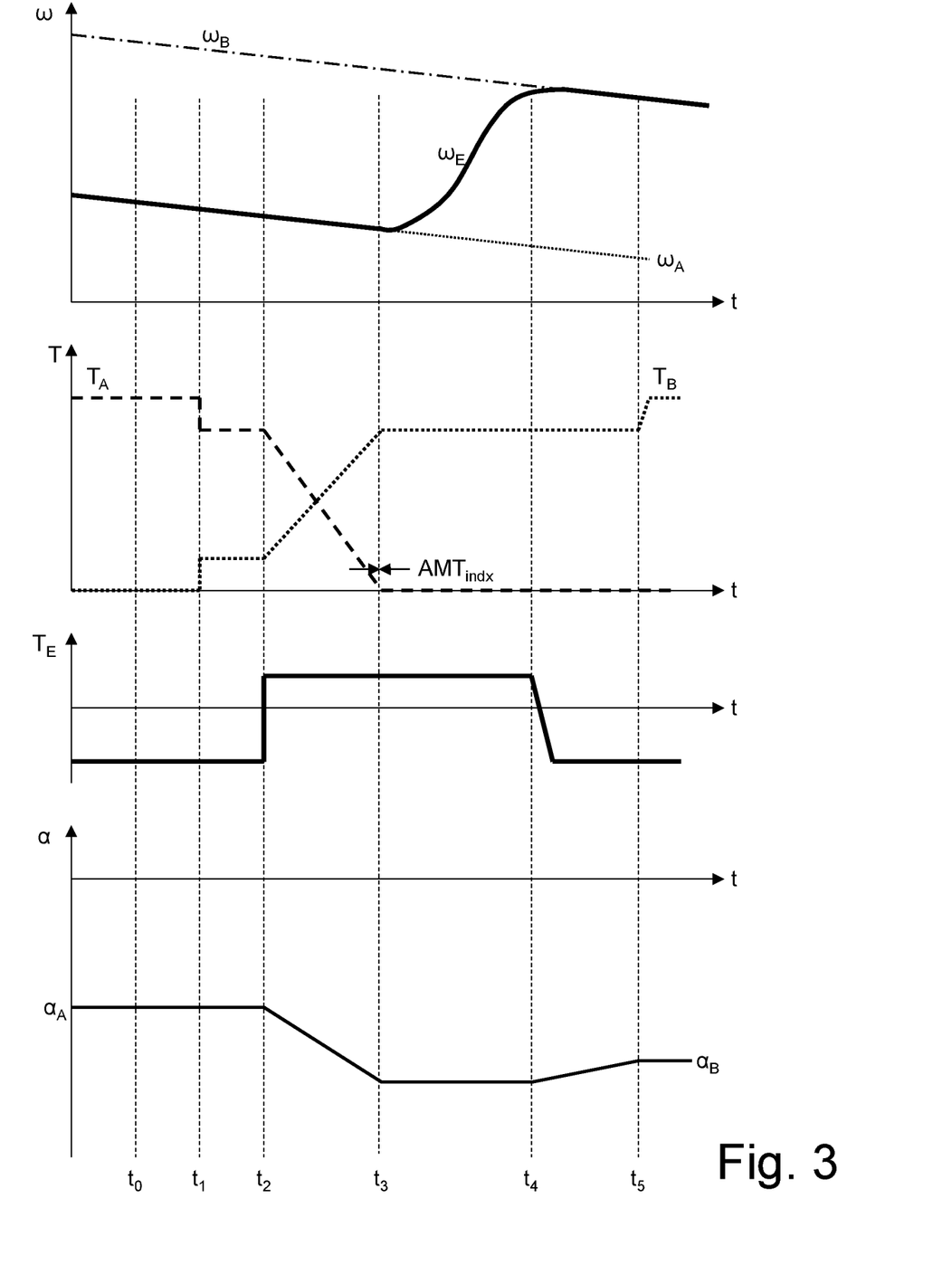
FIGS. 3-6 show the time development of the torques transmitted by the two clutches of the dual-clutch transmission, of the rotation speed of a drive shaft of the internal combustion engine, of the longitudinal deceleration of the road vehicle and of the torque generated by the internal combustion engine during respective shifts to a lower gear carried out with the control method according to the invention.

FIG. 3 shows the ways in which a shift to a lower gear is carried out, the driver sending the downshift command by acting upon the downshift paddle shifter 25 while the accelerator pedal 22 is released. FIG. 3 shows, starting from the top:

a first diagram showing the time development of the rotation speed $\omega_E$ of the internal combustion engine 4, the rotation speed $\omega_A$ of the outgoing clutch 16A and the rotation speed $\omega_B$ of the incoming clutch 16B;

a second diagram showing the time development of the torques $T_A$ and $T_B$ transmitted by the two clutches 16A and 16B;

a third diagram showing the time development of the torque $T_E$ generated by the internal combustion engine 4 (before and after the downshift the internal combustion engine 4 is in cut-off condition and, hence, operates in engine braking mode generating a negative torque $T_E$); and a fourth diagram showing the time development of the longitudinal acceleration α of the vehicle 1 (it should be pointed out that the longitudinal acceleration α of the vehicle 1 always is negative, namely the vehicle 1 is slowing down as the internal combustion engine 4 is substantially generating a negative torque $T_E$, namely is braking, thus operating in engine braking mode).

As soon as the control unit 12 of the drivetrain 6 receives the gear shift command from the driver (instant $t_0$), the control unit 12 of the drivetrain immediately starts filling the incoming clutch 16B, namely it immediately starts feeding oil under pressure into the incoming clutch 16B; indeed, the incoming clutch 16B associated with the following gear B can transmit a significant torque to the rear drive wheels 3 only when the filling with oil under pressure has been completed and, hence, the oil under pressure, for it cannot occupy further volume inside the incoming clutch 16B, exerts a thrust that packs the discs of the incoming clutch 16B. As a consequence, before the incoming clutch 16B associated with the following gear B can actually start transmitting a significant torque to the rear drive wheels 3, it is necessary to wait for a given delay time interval (typically ranging from 80 to 220 thousandths of second), during which the filling of the incoming clutch 16B with oil is completed. The completion of the filling of the incoming clutch 16B is normally monitored through a pressure sensor, which detects the pressure of the oil inside the incoming clutch 16B: when the pressure of the oil inside the incoming clutch 16B exceeds a predetermined threshold, this means that the inner volume of the incoming clutch 16B was completely filled and, hence, the oil inside the clutch 16B starts compressing. As a consequence, the instant $t_1$ in which (after the delay time has elapsed) the incoming clutch 16B is filled with oil and is ready to transit a significant torque is established when the pressure of the oil inside the incoming clutch 16B exceeds the predetermined threshold.

From the instant $t_0$, in which the control unit 12 of the drivetrain immediately starts closing the incoming clutch 16B, to the instant $t_1$, in which, after the delay time has elapsed, the incoming clutch 16B is filled with oil and is ready to transmit a significant torque, nothing happens to the dynamic of the road vehicle 1, i.e. the entire torque $T_E$ generated by the internal combustion engine 4 (which is a negative torque $T_E$, namely a braking torque $T_E$, since the internal combustion engine 4 is in cut-off condition and, hence, operates as engine brake) is entirely transmitted by the outgoing clutch 16A, like before the beginning of the gear shift. In the instant $t_1$, the incoming clutch 16B starts transmitting a torque $T_B$ (namely, the torque $T_B$ starts increasing) and, at the same time, the outgoing clutch 16A is ordered to open (namely, the torque $T_A$ starts decreasing); it should be pointed out that the opening of the outgoing clutch 16A associated with the current gear A takes place with no delay as the outgoing clutch 16A is already filled with oil under pressure and, in this phase, it simply needs to be emptied from part of the oil by opening a solenoid valve (whose action, thus, is instantaneous).

Between the instants $t_1$ and $t_2$ there is a partial and reduced transfer of torque between the two clutches 16A and 16B, namely the torque transmitted by the outgoing clutch 16A decreases in a step-like manner and, at the time, the torque transmitted by the incoming clutch 16B increases in a step-like manner and by the same quantity. Subsequently, between the instants $t_2$ and $t_3$ there is the complete transfer of torque between the two clutches 16A and 16B, i.e. the torque transmitted by the outgoing clutch 16A progressively decreases (the outgoing clutch 16A is opened by means of a linear ramp) and, at the same time, the torque transmitted by the incoming clutch 16B progressively increases (the incoming clutch 16B is closed by means of a linear ramp), thus determining a crossing between the two clutches 16A and 16B. The clutches 16A and 16B are opened and closed by means of linear ramps, namely the respective torques $T_A$ and $T_B$ change over time (decreasing and increasing) with linear variation laws.

In the embodiment shown in FIG. 3, the outgoing clutch 16A is completely opened in the same amount of time needed to completely close the incoming clutch 16B, so as to obtain a symmetric crossing. In the instant $t_3$, the outgoing clutch 16A is completely open (hence, it does not transmit any torque any longer), whereas the incoming clutch 16B transmits the entire torque $T_E$ of the internal combustion engine 4. Between the instants $t_1$ and $t_3$ there is the shifting time, during which the torque transmitted by the outgoing clutch 16A decreases until it becomes zero and, simultaneously, the torque transmitted by the incoming clutch 16B increases until it reaches the torque $T_E$ generated by the internal combustion engine 4 (as already mentioned above, the internal combustion engine 4 is in cut-off condition and, hence, operates as engine brake, thus generating a negative torque $T_E$), namely during which the outgoing clutch 16A separates itself from the drive wheels 3 and the incoming clutch 16B gets connected to the drive wheels 3.

The rotation speed $\omega_E$ of the internal combustion engine 4 is equal to the rotation speed $\omega_A$ imposed by the gear ratio of the current gear A before the gear shift until the instant $t_3$, it progressively increases towards the rotation speed $\omega_B$ imposed by the gear ratio of the following gear during the gear shift and is equal to the rotation speed $\omega_B$ after the gear shift. According to FIG. 3, until the instant $t_3$ the clutch 16A is not completely open yet and, therefore, the rotation speed $\omega_E$ of the internal combustion engine 4 is equal (corresponds) to the rotation speed $\omega_A$ imposed by the gear ratio of the current gear A associated with the outgoing clutch 16A; as a consequence, the rotation speed $\omega_E$ of the internal combustion engine 4 is increased only after the outgoing clutch 16A has been completely opened.

Between the instants $t_3$ and $t_4$ there is the synchronization time, during which the rotation speed $\omega_E$ of the internal combustion engine 4 increases from the rotation speed $\omega_A$ imposed by the gear ratio of the current gear A to the rotation speed $\omega_B$ imposed by the gear ratio of the following gear B, namely the rotation speed $\omega_E$ is synchronized with the rotation speed $\omega_B$.

In order to increase the rotation speed $\omega_E$ of the internal combustion engine 4 after the complete opening of the incoming clutch 16A, between the instants $t_2$ and $t_4$ the internal combustion engine 4 is turned on so as to have it generate a positive torque $T_E$ (namely, a drive torque and not a braking torque); i.e. the internal combustion engine 4 is turned on in the instant $t_2$ and is turned off in the instant $t_4$. In other words, in order to synchronize the rotation speed $\omega_E$ of the internal combustion engine 4 with the rotation speed $\omega_B$ of the incoming clutch 16B, the torque $T_E$ generated by the internal combustion engine 4 is temporarily increased (so that, between the instants $t_2$ and $t_4$, it becomes a drive torque and is not a braking torque any longer).

The longitudinal acceleration $\alpha$ of the road vehicle 1 is approximately constant and equal to the value $\alpha_A$ (which is negative, since the vehicle is slowing down) immediately before the gear shift and is approximately constant and equal to the value $\alpha_B$ (which is negative, since the vehicle is slowing down, and greater than the value $\alpha_A$ in absolute value) immediately after the gear shift. During the gear shift, the longitudinal acceleration of the vehicle 1 progressively decreases from the initial value $\alpha_A$ to the final value $\alpha_B$.

In the embodiment shown in FIG. 3, the advance of the complete opening of the outgoing clutch 16A relative to the complete transfer (which takes place in the instant $t_3$) of the entire torque $T_E$ of the internal combustion engine 4 to the incoming clutch 16B is zero, namely the outgoing clutch 16A is completely opened in the instant $t_3$ in which the transfer of the entire torque $T_E$ of the internal combustion engine 4 to the incoming clutch 16B is completed; said advance is identified in FIG. 3 with the term $AMT_{indx}$ and is zero (namely, minimal). In the variant shown in FIG. 4, the downshift takes place in the same ways shown in FIG. 3 and described above, with the sole difference that the advance $AMT_{indx}$ of the complete opening of the outgoing clutch 16A relative to the complete transfer of the entire torque $T_E$ of the internal combustion engine 4 to the incoming clutch 16B is no longer zero (on a scale from 0 to 100 it is approximately 40), namely the outgoing clutch 16A is completely opened before the complete transfer (which takes place in the instant $t_3$) of the entire torque $T_E$ of the internal combustion engine 4 to the incoming clutch 16B; in other words, the outgoing clutch 16A is completely opened in advance relative to the instant $t_3$ in which the transfer of the entire torque $T_E$ of the internal combustion engine 4 to the incoming clutch 16B is completed. In the further variant shown in FIG. 5, the downshift takes place in the same ways shown in FIG. 3 and described above, with the sole difference that the advance $AMT_{indx}$ of the complete opening of the outgoing clutch 16A relative to the complete transfer of the entire torque $T_E$ of the internal combustion engine 4 to the incoming clutch 16B is no longer zero, but is maximum (on a scale from 0 to 100 it is 100), namely the outgoing clutch 16A is completely opened in the instant $t_2$, long before the complete transfer (which takes place in the instant $t_3$) of the entire torque $T_E$ of the internal combustion engine 4 to the incoming clutch 16B; in other words, the outgoing clutch 16A is completely opened in the instant $t_2$, significantly in advance relative to the instant $t_3$ in which the transfer of the entire torque $T_E$ of the internal combustion engine 4 to the incoming clutch 16B is completed.

Figure 5:
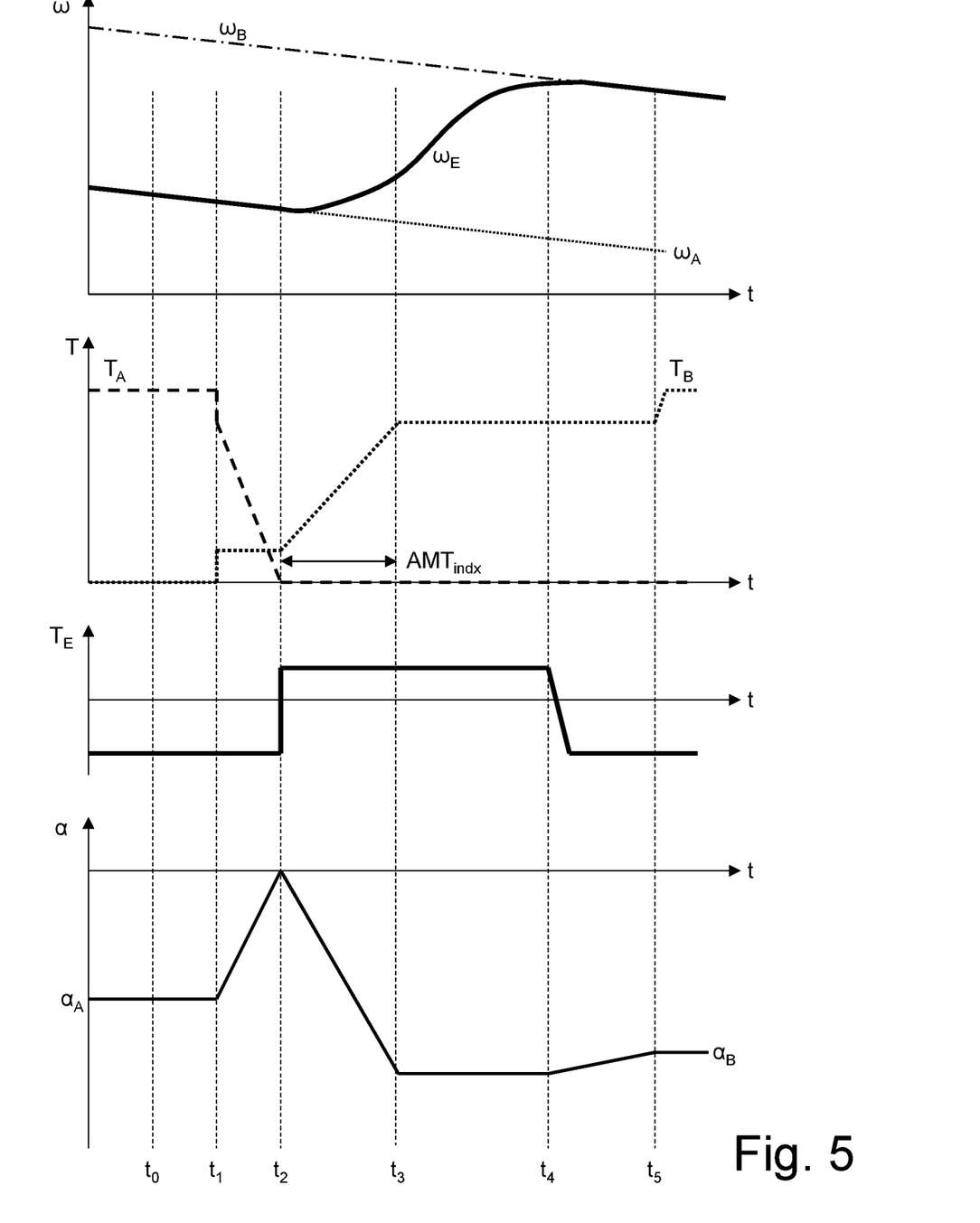

In other words, the advance $AMT_{indx}$ indicates the extent to which the complete opening of the outgoing clutch 16A is advanced relative to the complete transfer (which takes place in the instant $t_3$) of the entire torque $T_E$ of the internal combustion engine 4 to the incoming clutch 16B and ranges from a minimum of zero (the complete opening of the outgoing clutch 16A takes place in the same instant $t_3$ as the complete transfer of the entire torque $T_E$ of the internal combustion engine 4 to the incoming clutch 16B, like in the embodiment shown in FIG. 3) to a maximum of 100 (the complete opening of the outgoing clutch 16A takes place in the instant $t_2$, like in the embodiment shown in FIG. 5).

By changing the advance $AMT_{indx}$, the mode of execution of the downshift is changed as well; as a consequence, the control unit 12 of the drivetrain 6 can act upon the advance $AMT_{indx}$ so as to obtain different downshifts depending on the desires expressed by the driver (who could act upon a selector known as "hand lever" to choose the preferred driving style, namely a more comfort-oriented style or more fun/sports oriented style). Indeed, it should be pointed out that, in the embodiments shown in FIGS. 3, 4 and 5, the time profile of the longitudinal deceleration a of the road vehicle 1 changes.

Figure 4:
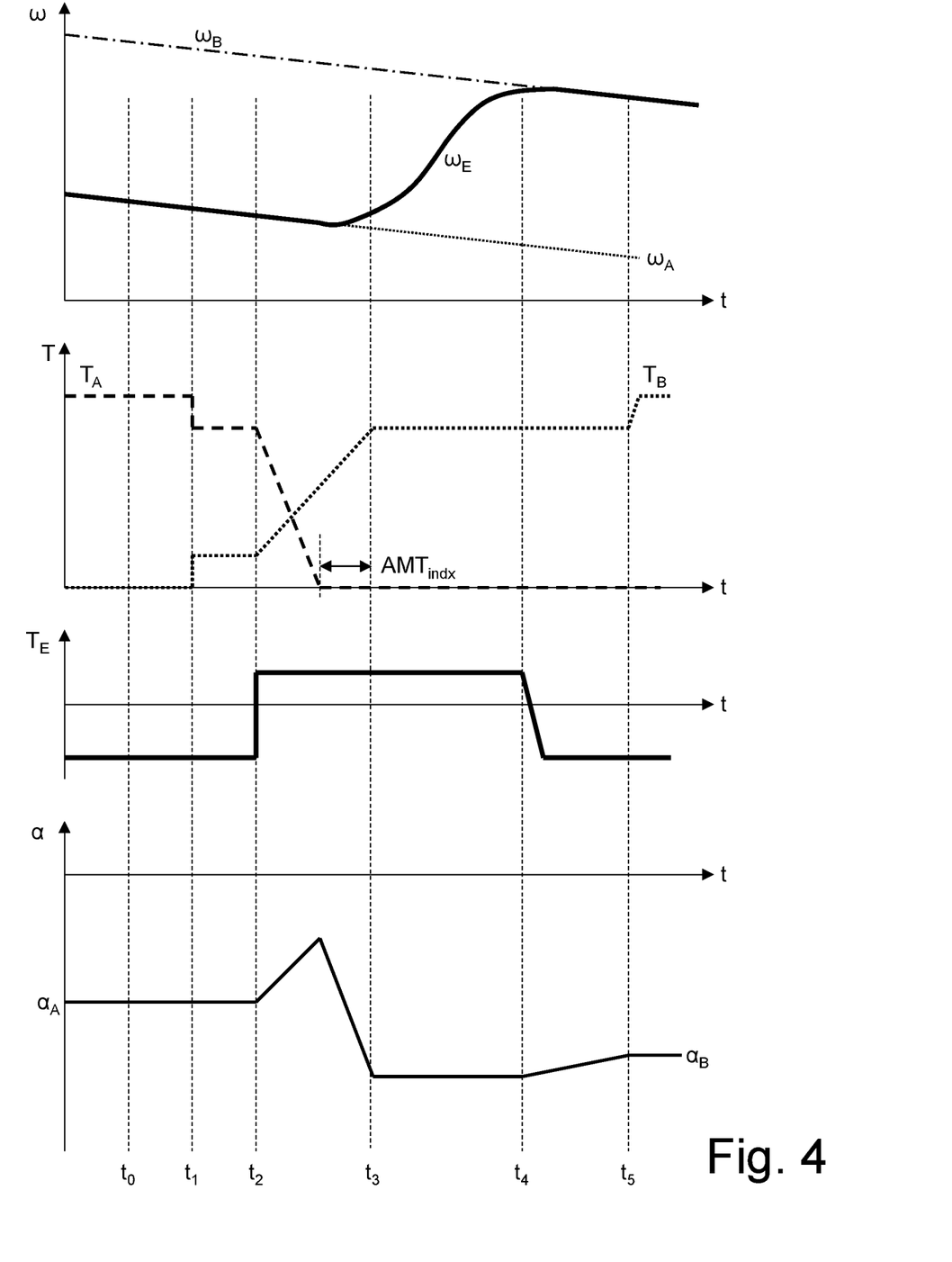
Figure 6:
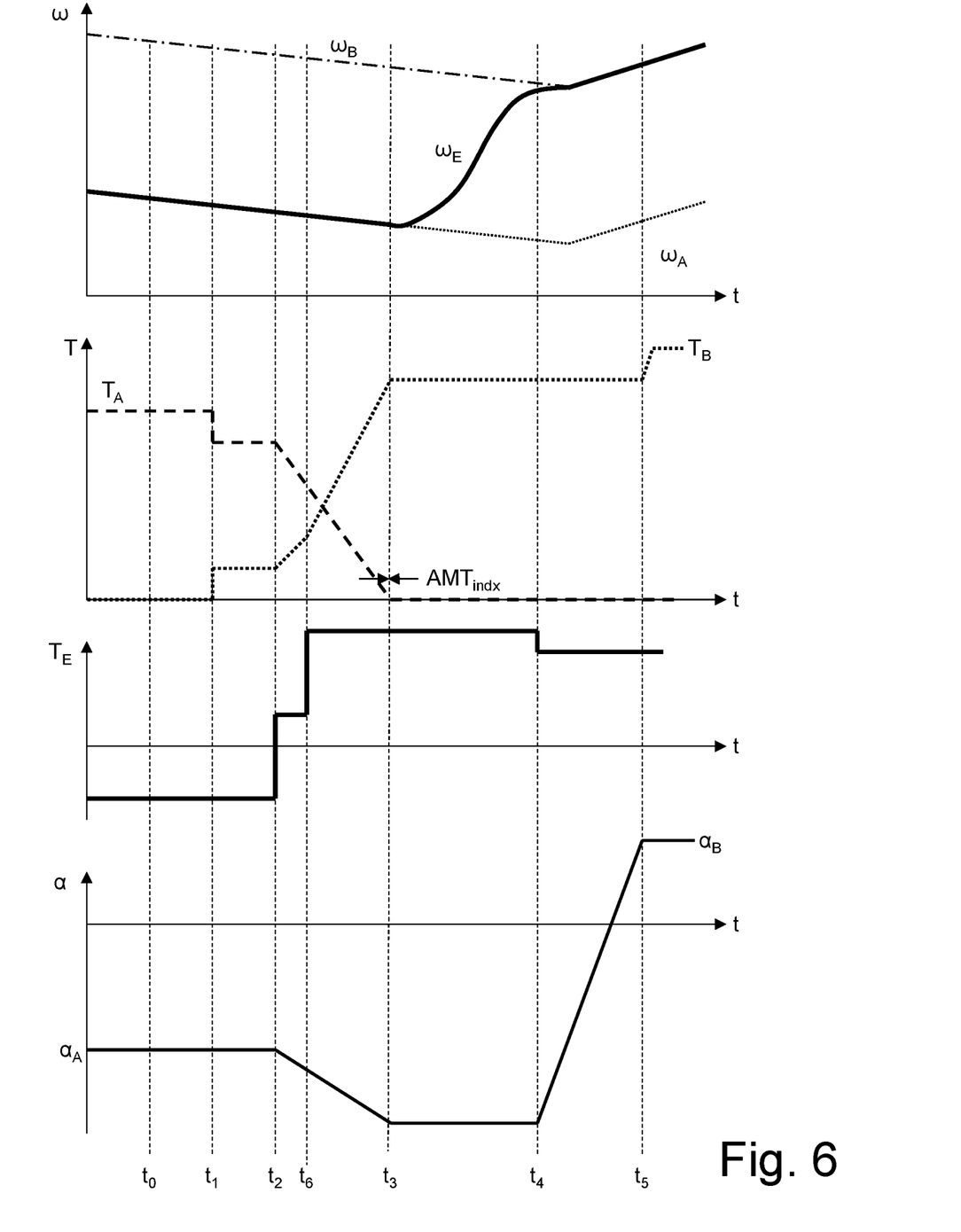

In the embodiments shown in FIGS. 3, 4 and 5, the internal combustion engine 4 is in cut-off condition before the downshift (hence, it operates as engine brake generating a braking torque $T_E$) and continues being in a cut-off condition even after the downshift; namely, before, during and after the downshift the driver keeps the accelerator pedal 22 completely released. However, it can happen that the driver, after having requested the downshift (namely, after the instant $t_0$), decides to press the accelerator pedal 22, thus requesting that the internal combustion engine 4 generates a positive torque $T_E$ (namely, a drive torque); this situation is present in the embodiment shown in FIG. 6, in which in the instant $t_6$ (for example placed between the instant $t_2$ and the instant $t_3$) the driver, after having requested the downshift (namely, after the instant $t_0$), presses the accelerator pedal 22. Obviously, the control unit 12 of the drivetrain 6 must anyway complete the downshift that has already started, but can try and give an immediate response to the new (and unpredicted) request of the driver, so as to give the driver a feeling of extreme responsiveness; as a consequence, starting from the instant $t_6$, the control unit 12 of the drivetrain 6 requests that the control unit 11 of the internal combustion engine 4 increases the torque $T_E$ generated by the internal combustion engine 4 (according to the request of the driver, who pressed the accelerator pedal 22) and, at the same time, accelerates the closing of the incoming clutch 16B (namely, makes the closing of the incoming clutch 16B faster), which, obviously, now has to transmit, as a whole, a greater torque $T_B$ due to the fact that the internal combustion engine 4 was turned on.

The control method described above has different advantages.

First of all, the method to control the execution of a shift to a lower gear with a released accelerator pedal described above is very comfortable, as, since the transmission of the torque to the drive wheels 3 is never interrupted, it determines a comfortable longitudinal acceleration profile of the road vehicle: indeed, the longitudinal acceleration of the road vehicle gradually shifts, without gradient inversion, from an initial deceleration to a final deceleration, which is greater than the previous one (in the downshift the gear ratio gets shorter and, therefore, the engine brake has a more incisive effect on the dynamic of the road vehicle 1); in this way, the driver always has a feeling of continuous deceleration.

Furthermore, the method to control the execution of a shift to a lower gear with a released accelerator pedal described above does not generate any perceivable metal noise, as the two clutches 16A and 16B never are both open at the same time and, hence, the drivetrain 6 always is "under stress"; namely, backlashes are significantly reduced and, as a consequence, so are noises, since the gear trains of the drivetrain 6 always are "under stress".

The method to control the execution of a shift to a lower gear with a released accelerator pedal described above also allows for the implementation of a new strategy (also called "change of mind"), which allows the torque $T_B$ of the incoming clutch 16B to be adjusted if, during the downshift, the driver presses the accelerator pedal 22, thus allowing for a more prompt and quick response of the road vehicle 1 to the commands of the driver.

The method to control the execution of a shift to a lower gear with a released accelerator pedal described above allows for a customization of the time profile of the longitudinal acceleration $\alpha$ of the road vehicle 1 based on the preferences of the driver, with a simple adjustment of the advance $AMT_{indx}$ of the complete opening of the outgoing clutch 16A relative to the complete transfer of the entire torque $T_E$ of the internal combustion engine 4 to the incoming clutch 16B.

Finally, the control method described above is easy and economic to be implemented, since it does not require the installation of additional physical components and does not call for an expansion of the control unit 12 of the drivetrain 6, since no additional calculation ability is needed.

LIST OF THE REFERENCE NUMBERS OF THE FIGURES

1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers
21 steering wheel
22 accelerator pedal
23 brake pedal
24 upshift paddle shifter
25 downshift paddle shifter
$\omega_E$ rotation speed
$\omega_A$ rotation speed
$\omega_B$ rotation speed
$T_E$ torque
$T_A$ torque
$T_B$ torque
$\alpha$ acceleration
$t_0$ time instant
$t_1$ time instant
$t_2$ time instant
$t_3$ time instant
$t_4$ time instant
$t_5$ time instant
$t_6$ time instant
$AMT_{indx}$ advance of the complete opening

The invention claimed is:

1. A method to control the execution of a shift to a lower gear with a released accelerator pedal in a drivetrain provided with a dual-clutch, servo-assisted transmission, so as to shift from a current gear to a following gear, which is shorter than the current gear; the drivetrain comprises a dual-clutch, servo-assisted transmission having two primary shafts; at least one secondary shaft connected to drive wheels; and two clutches, each interposed between a drive shaft of an internal combustion engine and a corresponding primary shaft; the control method comprises the steps of:
   opening, in a first instant, an outgoing clutch associated with the current gear;
   closing, in the first instant, an incoming clutch associated with the following gear;
   completing the opening of the outgoing clutch by means of a first linear ramp in a second instant;
   closing the incoming clutch by means of a second linear ramp starting from a third instant, which is prior to or coincides with the second instant;
   synchronizing, between the second instant and a fourth instant, a rotation speed of the internal combustion engine with a rotation speed of the incoming clutch, namely with the rotation speed imposed by the gear ratio of the following gear;
   completing the closing of the incoming clutch in a fifth instant, which coincides with or is subsequent to the second instant; and
   activating the internal combustion engine so as to generate a torque between the third instant and the fourth instant in order to increase the rotation speed of the internal combustion engine.

2. The control method according to claim 1, wherein the fifth instant coincides with the second instant.

3. The control method according to claim 1, wherein the fifth instant is subsequent to the second instant.

4. The control method according to claim 1, wherein the third instant is prior to the second instant.

5. The control method according to claim 1, wherein the third instant coincides with the second instant.

6. The control method according to claim 1, wherein a longitudinal deceleration of a road vehicle increases between the fourth instant and the fifth instant.

7. The control method according to claim 1 and comprising the further steps of:
   detecting a preference of a driver; and
   changing, based on the preference of the driver, an advance of the complete opening of the outgoing clutch relative to a complete transfer of the entire torque of the internal combustion engine to the incoming clutch.

8. The control method according to claim 7, wherein the advance of the complete opening of the outgoing clutch relative to the complete transfer of the entire torque of the internal combustion engine to the incoming clutch is variable between a minimum, when the outgoing clutch is completely opened in the fifth instant, and a maximum, when the outgoing clutch is completely opened in the fourth instant.

9. The control method according to claim 1, wherein the internal combustion engine is in cut-off condition before the shift to a lower gear and is in cut-off condition also after the shift to a lower gear.

10. The control method according to claim 9, wherein, before, during and after the shift to a lower gear, a driver keeps the accelerator pedal completely released.

11. The control method according to claim 1 and comprising the further steps of:
  - detecting a pressing of the accelerator pedal exerted by a driver during the shift to a lower gear;
  - increasing, in case the accelerator pedal is pressed by a driver during a shift to a lower gear, the torque generated by the internal combustion engine; and
  - accelerating, in case the accelerator pedal pressed by a driver during a shift to a lower gear, the closing of the incoming clutch.

* * * * *